R. L. FORD.
CORN PLANTER CLUTCH CONTROLLING MECHANIS
APPLICATION FILED JULY 26, 1915.
1,250,298.
Patented Dec. 18, 1917.
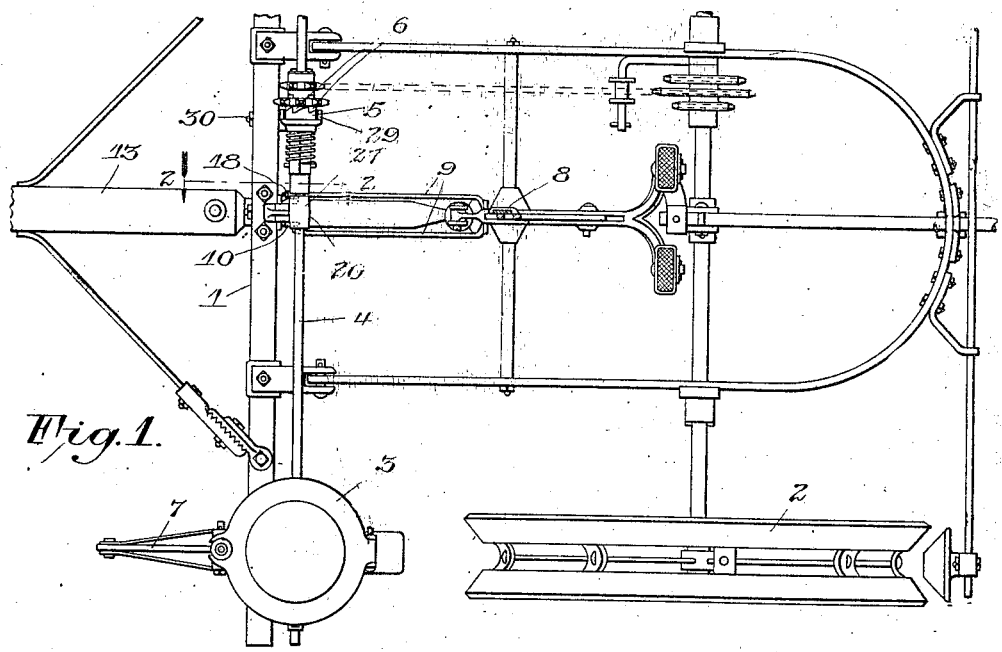
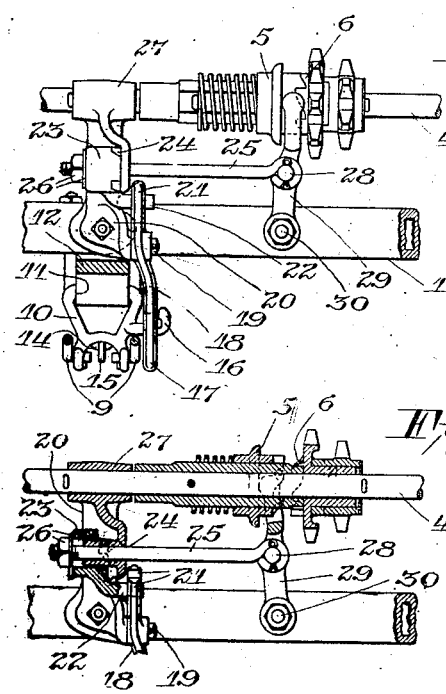
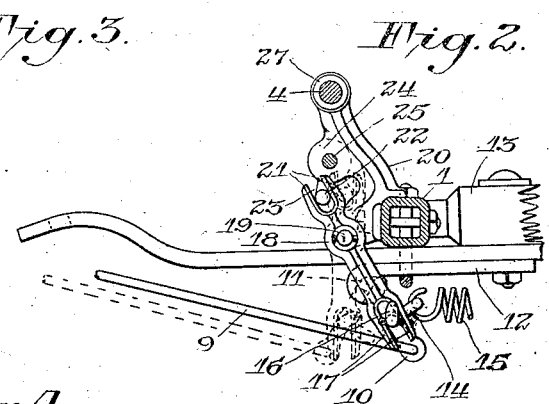
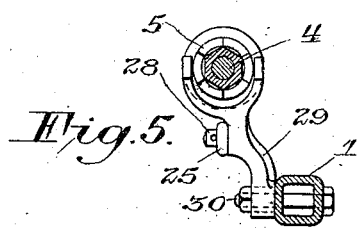
Inventor:
Ralph L. Ford,
By Chas. E. Lord
Atty ed to control the clutch of a drill type
UNITED STATES PATENT OFFICE.

RALPH L. FORD, OF CHICAGO, ILLINOIS, ASSIGNOR TO INTERNATIONAL HARVESTER CORPORATION, A CORPORATION OF NEW JERSEY.

CORN-PLANTER-CLUTCH-CONTROLLING MECHANISM.

1,250,298.  Specification of Letters Patent.  Patented Dec. 18, 1917.

Application filed July 26, 1915.  Serial No. 42,040.

*To all whom it may concern:*

Be it known that I, RALPH L. FORD, a citizen of the United States, residing at Chicago, in the county of Cook and State of Illinois, have invented certain new and useful Improvements in Corn-Planter-Clutch-Controlling Mechanism, of which the following is a full, clear, and exact specification.

My invention relates to corn planter clutch controlling mechanism.

It has among its objects to provide an improved clutch controlling mechanism automatically operable as the planter runners are raised or lowered, and especially adapted to control the clutch of a drill type planter, so that the drilling mechanism is thrown into or out of gear automatically upon raising or lowering of the runners.

A further object of my invention is to produce an improved construction of a type which is exceedingly rugged, which may be readily and cheaply manufactured, and which may be assembled complete on one member or part of the machine, and thereby make it less liable to give trouble and to require adjustment when set up by the user.

I attain these objects by improved mechanism wherein the movement of the runner adjusting lever is transmitted to a rocking member, which in turn controls a reciprocating member connected to the clutch shipper so that upon a rotary movement of the rocking member the reciprocating member is moved and the clutch connection shifted, all as hereinafter more specifically set forth.

In the accompanying drawings I have, for purposes of illustration, shown one embodiment which my invention may assume in practice.

In these drawings:

Figure 1 is a plan view of a corn planter equipped with my improvement;

Fig. 2 is a detail view of a portion of the clutch operating mechanism, the view being a reversed view taken approximately on line 2—2 of Fig. 1 and looking in the direction of the arrows;

Fig. 3 is a detail partial sectional view showing the clutch mechanism and the ratchet controlling mechanism therefor;

Fig. 4 is a detail sectional view of the construction shown in Fig. 3;

Fig. 5 is a detail view, partially in section, of the clutch shipping mechanism *per se.*

In the construction shown a planter of standard type is illustrated, having a frame 1 mounted upon carrying wheels 2 and carrying seed boxes 3 connected by a drill shaft 4, which is controlled in the usual manner by a movable spring-pressed clutch member 5 reciprocating thereon and controlling the connection of the shaft 4 to a coöperating clutch member 6 carrying the power sprockets rotatable from the wheels of the planter. The planter shown is also provided with runners 7 under each seed box which are connected to a lever 8 in such a manner that they may be raised and lowered whenever the lever 8 is moved about its pivot.

In my improved construction I have provided an improved connection between the lever 8 and clutch 5 whereby, as the lever 8 is moved about its pivot to raise and lower the runners 7, the clutch 5 is thrown into or out of gear. As shown, the lever 8 is connected to a pair of spaced forwardly protruded links 9 of well-known construction which extend toward the shaft 4 and pass beneath the same, being pivotally connected at their front ends to a link or bracket member 10, which is in turn pivoted at 11 to a strap 12 underlying the pole 13 of the planter. Operatively connected to a forwardly extending lug 14 on this bracket 10, and disposed longitudinally beneath the pole 13, is the usual spring 15 connected at its front end to the pole. Projecting laterally from this bracket 10 is also a lug or arm 16 which passes between the legs 17 of a bifurcated member or fork 18 pivoted at 19 at a point near its upper end upon a bracket 20 fixed to the cross member of the frame member 1. The upper end of this fork 18 is also bifurcated, being provided with arms 21 which receive between them a transversely disposed member 22, preferably formed integral with a rotating cam member 23 coöperating with a fixed cam member 24 formed on the bracket 20 and rotatable about the member 24 as a pivot. As shown, a link 25 is adjustably attached by a washer and bolt connection 26 to the movable ratchet member 23 and is reciprocated thereby, when the cam member 23 is rotated, through a suitable bearing in the bracket member 20, the latter bracket member, in order to form a stable support, preferably being provided with an extension or sleeve 27 which acts as a bearing for the shaft 4 at 110 a point adjacent the reciprocable spring-pressed clutch member 5. As shown, the opposite end of this link 25 is pivotally connected at 28 to a clutch shipper 29 pivoted at 30 to the cross frame member of the frame 1 and operatively connected in a well-known manner to the clutch member 5 so as to reciprocate the same out of or into engagement with the coöperating clutch member 6 carrying the sprockets.

It will be noted that in the operation of the device, when the lever 8 is moved about its pivot, the links 9 will cause the fork 18 to be thrown about its pivot 19 at the same time that the spring 15 is expanded, and the movement of the fork will, through its upper arms 21, throw the member 22, and consequently the cam member 23, about a pivot on the fixed cam member 24, with the result that the link 25 will be retracted and cause the clutch member 5 to be shifted out of connection with its coöperating clutch member 6. Obviously, when the lever is reversed, the clutch member 5, being a spring-pressed clutch member, will be returned to its operative position, the other parts being also returned by the spring 15.

While I have in this application specifically described one embodiment which my invention may assume in practice, it is, of course, to be understood that the form shown is used for purposes of illustration, and that the invention itself is not limited to embodiment therein and may be used in other forms than that shown.

What I claim as new is:

1. In a corn planter clutch controlling mechanism, a frame, a bracket pivoted thereon, means for swinging the bracket about its pivot, an oscillating member pivoted to said frame and operatively connected with said bracket and movable by said bracket, a cam member operatively connected to said oscillating member and movable thereby, a fixed cam member carried on said frame, and a reciprocating member operatively connected to said movable cam member and reciprocable thereby when said bracket is moved about its pivot.

2. In a corn planter clutch controlling mechanism, a frame, a bracket member pivoted thereon having a laterally extending arm, means for swinging the bracket about its pivot, an oscillatory fork member pivoted at a point between its ends to said frame, a cam member journaled on said frame having a portion thereof engageable with the upper end of the oscillatory fork member and rotatable about an axis parallel to the axis of said member, a reciprocable clutch member, and means whereby upon rotation of said rotating cam member said clutch member is reciprocated.

3. In a corn planter clutch controlling mechanism, a frame, a bracket member pivoted thereon having a laterally extending arm thereon, lever mechanism carried on said frame, mechanism operatively connecting the same to said bracket, a spring operatively connected between said frame and said bracket, an oscillating member pivoted on said frame engageable with the arm on said bracket, a rotating member journaled on said frame and engageable with said oscillating member, and means whereby upon movement of said oscillating member said rotating member is rotated and moved bodily longitudinally relative to the axis of said oscillating member.

4. In a corn planter clutch controlling mechanism, a frame, a bracket member pivoted thereon having a laterally extending arm thereon, lever mechanism carried on said frame, mechanism operatively connecting the same to said bracket, a spring operatively connected between said frame and said bracket, an oscillating member pivoted on said frame engageable with the arm on said bracket, a rotating member journaled on said frame and engageable with said oscillating member, means whereby upon movement of said oscillating member said rotating member is rotated and moved bodily longitudinally relative to the axis of said oscillating member, and a clutch shipping member operatively connected to said rotating member.

In testimony whereof I affix my signature.

RALPH L. FORD.